United States Patent
McKenzie et al.

(10) Patent No.: US 6,693,904 B1
(45) Date of Patent: Feb. 17, 2004

(54) TRACE FORMAT FOR A SLICED SWITCH FABRIC

(75) Inventors: Blaine A. McKenzie, Naperville, IL (US); Michael L. Steinberger, Colts Neck, NJ (US); Warren C. Trested, Jr., E. Hampstead, NH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/057,658

(22) Filed: Apr. 9, 1998

(51) Int. Cl.[7] .............................................. H04L 12/50
(52) U.S. Cl. ...................................... 370/387; 370/248
(58) Field of Search ................................ 370/387, 388, 370/222, 223, 224, 248, 535, 395, 351, 360, 384, 241, 244, 537, 541, 413, 412, 411, 375, 386, 389

(56) References Cited

U.S. PATENT DOCUMENTS

| | | | | | |
|---|---|---|---|---|---|
| 4,933,930 A | * | 6/1990 | Lien | ............................ | 370/441 |
| 5,065,396 A | * | 11/1991 | Castellano | .................. | 370/536 |
| 5,119,369 A | * | 6/1992 | Tanabe | ........................ | 370/392 |
| 5,144,297 A | * | 9/1992 | Ohara | ......................... | 370/360 |
| 5,191,577 A | * | 3/1993 | Uchida | ........................ | 370/488 |
| 5,202,885 A | * | 4/1993 | Schrodi | ....................... | 370/388 |
| 5,550,978 A | * | 8/1996 | Takahashi | ................ | 370/395.1 |
| 5,557,621 A | * | 9/1996 | Nakano | .................... | 370/395.1 |
| 5,687,172 A | * | 11/1997 | Cloonan | .................. | 370/395.1 |
| 5,867,663 A | * | 2/1999 | McClure | ...................... | 370/413 |
| 5,917,805 A | * | 6/1999 | Manning | .................... | 370/236 |
| 5,987,028 A | * | 11/1999 | Yang | ............................ | 370/308 |
| 6,002,692 A | * | 12/1999 | Wills | .......................... | 370/465 |
| 6,031,842 A | * | 2/2000 | Trevitt | ......................... | 370/412 |
| 6,081,503 A | * | 6/2000 | Bordogna | ................... | 370/222 |
| 6,137,790 A | * | 10/2000 | Bordogna | ................... | 370/351 |
| 6,185,021 B1 | * | 2/2001 | Fatchi | ......................... | 359/117 |
| 6,192,172 B1 | * | 2/2001 | Fatchi | ......................... | 385/17 |
| 6,240,096 B1 | * | 5/2001 | Book | ......................... | 370/412 |
| 6,272,154 B1 | * | 8/2001 | Bala | ............................ | 370/535 |
| 6,301,228 B1 | * | 10/2001 | Bordogna | ................... | 370/244 |
| 6,445,705 B1 | * | 9/2002 | Holden | ........................ | 370/394 |
| 6,507,584 B1 | * | 1/2003 | Morikawi | ................... | 370/398 |

* cited by examiner

*Primary Examiner*—Douglas Olms
*Assistant Examiner*—Ricardo M. Pizarro

(57) ABSTRACT

A unique trace word is assigned to each incoming signal routed by a sliced switch fabric having two or more parallel switches. The unique trace word is encoded into each incoming signal following an overall format that ensures that each sliced trace word (i.e., the subset of bits in the overall format routed by each parallel switch) also uniquely identifies each incoming signal. In this way, the present invention ensures that the switch configuration of each and every parallel switch can always be verified. As such, any improper switch configuration can be detected, including those misconfigurations in which all but one of the parallel switches are correctly configured as well as those misconfigurations in which all of the parallel switches are identically, but incorrectly configured. In a preferred embodiment, the overall format is defined in terms of a table, in which each column comprises all of the bits of the unique trace word and the bits are shifted cyclically between pairs of columns to reduce the number of rows of the table that need to be processed before all of the bits in the unique trace word are available in the outgoing signal transmitted from the sliced switch fabric.

32 Claims, 2 Drawing Sheets

| TABLE I. OVERALL TRACE FORMAT ||||||||| 
|---|---|---|---|---|---|---|---|---|
| ROW | COLUMN ||||||||
| | 1 | 2 | 3 | 4 | 5 | 6 | 7 | 8 |
| 1: | W[1] | $\overline{W[1]}$ | W[6] | $\overline{W[6]}$ | W[11] | $\overline{W[11]}$ | W[16] | $\overline{W[16]}$ |
| 2: | W[2] | $\overline{W[2]}$ | W[7] | $\overline{W[7]}$ | W[12] | $\overline{W[12]}$ | W[17] | $\overline{W[17]}$ |
| 3: | W[3] | $\overline{W[3]}$ | W[8] | $\overline{W[8]}$ | W[13] | $\overline{W[13]}$ | W[18] | $\overline{W[18]}$ |
| 4: | W[4] | $\overline{W[4]}$ | W[9] | $\overline{W[9]}$ | W[14] | $\overline{W[14]}$ | W[19] | $\overline{W[19]}$ |
| 5: | W[5] | $\overline{W[5]}$ | W[10] | $\overline{W[10]}$ | W[15] | $\overline{W[15]}$ | W[20] | $\overline{W[20]}$ |
| 6: | FPI | $\overline{FPI}$ | FPI | $\overline{FPI}$ | FPI | $\overline{FPI}$ | FPI | $\overline{FPI}$ |
| 7: | W[6] | $\overline{W[6]}$ | W[11] | $\overline{W[11]}$ | W[16] | $\overline{W[16]}$ | W[1] | $\overline{W[1]}$ |
| 8: | W[7] | $\overline{W[7]}$ | W[12] | $\overline{W[12]}$ | W[17] | $\overline{W[17]}$ | W[2] | $\overline{W[2]}$ |
| 9: | W[8] | $\overline{W[8]}$ | W[13] | $\overline{W[13]}$ | W[18] | $\overline{W[18]}$ | W[3] | $\overline{W[3]}$ |
| 10: | W[9] | $\overline{W[9]}$ | W[14] | $\overline{W[14]}$ | W[19] | $\overline{W[19]}$ | W[4] | $\overline{W[4]}$ |
| 11: | W[10] | $\overline{W[10]}$ | W[15] | $\overline{W[15]}$ | W[20] | $\overline{W[20]}$ | W[5] | $\overline{W[5]}$ |
| 12: | FPI | $\overline{FPI}$ | FPI | $\overline{FPI}$ | FPI | $\overline{FPI}$ | FPI | $\overline{FPI}$ |
| 13: | W[11] | $\overline{W[11]}$ | W[16] | $\overline{W[16]}$ | W[1] | $\overline{W[1]}$ | W[6] | $\overline{W[6]}$ |
| 14: | W[12] | $\overline{W[12]}$ | W[17] | $\overline{W[17]}$ | W[2] | $\overline{W[2]}$ | W[7] | $\overline{W[7]}$ |
| 15: | W[13] | $\overline{W[13]}$ | W[18] | $\overline{W[18]}$ | W[3] | $\overline{W[3]}$ | W[8] | $\overline{W[8]}$ |
| 16: | W[14] | $\overline{W[14]}$ | W[19] | $\overline{W[19]}$ | W[4] | $\overline{W[4]}$ | W[9] | $\overline{W[9]}$ |
| 17: | W[15] | $\overline{W[15]}$ | W[20] | $\overline{W[20]}$ | W[5] | $\overline{W[5]}$ | W[10] | $\overline{W[10]}$ |
| 18: | FPI | $\overline{FPI}$ | FPI | $\overline{FPI}$ | FPI | $\overline{FPI}$ | FPI | $\overline{FPI}$ |
| 19: | W[16] | $\overline{W[16]}$ | W[1] | $\overline{W[1]}$ | W[6] | $\overline{W[6]}$ | W[11] | $\overline{W[11]}$ |
| 20: | W[17] | $\overline{W[17]}$ | W[2] | $\overline{W[2]}$ | W[7] | $\overline{W[7]}$ | W[12] | $\overline{W[12]}$ |
| 21: | W[18] | $\overline{W[18]}$ | W[3] | $\overline{W[3]}$ | W[8] | $\overline{W[8]}$ | W[13] | $\overline{W[13]}$ |
| 22: | W[19] | $\overline{W[19]}$ | W[4] | $\overline{W[4]}$ | W[9] | $\overline{W[9]}$ | W[14] | $\overline{W[14]}$ |
| 23: | W[20] | $\overline{W[20]}$ | W[5] | $\overline{W[5]}$ | W[10] | $\overline{W[10]}$ | W[15] | $\overline{W[15]}$ |
| 24: | $\overline{FPI}$ | FPI | $\overline{FPI}$ | FPI | $\overline{FPI}$ | FPI | $\overline{FPI}$ | FPI | ns
TRACE FORMAT FOR A SLICED SWITCH FABRIC

BACKGROUND OF THE INVENTION

1. Field of the Invention

The present invention relates to signal processing, and, in particular, to the routing of communication signals through a sliced switch fabric.

2. Description of the Related Art

In a typical multi-user communication system, such as a telephony system, signals are transmitted back and forth between different users. Such a system typically has one or more switch nodes, each of which is responsible for receiving a plurality of incoming signals from one or more different sources and routing those signals for transmission as outgoing signals to one or more different destinations. It is desirable to verify that a switch node is correctly configured to route incoming signals to the appropriate destinations.

One conventional technique for verifying the configuration of a switch node is to encode each incoming signal with a special binary code word that identifies that incoming signal. This special binary code word is often referred to as a trace word, because it can be used to trace the path of a signal through the different components of the communication system. By decoding the trace word contained in each outgoing signal transmitted from the switch node, it can be determined if the switch node is properly configured.

In order to attempt to ensure that the configuration of a switch node can always be verified, in conventional techniques, each incoming signal is assigned a unique trace word. In order for each incoming signal to have a unique trace word, the binary trace word must have at least as many bits as needed to assign a different trace word to each incoming signal for up to the maximum number of concurrent signals that the switch node can handle. For example, if a particular switch node can support up to $2^{18}$ different incoming signals at one time, the binary trace word encoded into each incoming signal must have at least 18 bits in order to ensure that each incoming signal can be assigned a different trace word. Since trace words take up space in the signal bit stream, it is generally desirable to keep trace words as short as possible, especially in systems having limited bandwidth for such overhead information. A shorter trace word also allows a misconnection to be detected more quickly.

In order to handle faster and faster data rates, some conventional switch nodes are designed with a sliced switch fabric architecture, in which multiple switches operate in parallel on different subsets of data from each incoming signal. In a bit-sliced architecture, each incoming serial data stream is parallelized on a bit-by-bit basis. That is, each data stream is demultiplexed in one-bit segments into two or more parallel streams, where each parallel stream comprises a subset of the bits of the original data stream. Other types of sliced architectures are also possible, such as byte-sliced architectures, in which serial data streams are parallelized on a byte-by-byte basis.

FIG. 1 shows a block diagram of the bit-sliced switch fabric 100 of a typical switch node having a sliced architecture. Switch fabric 100 has a column of n input demultiplexers 102, a column of m switches 104, and a column of n output multiplexers 106, where n is the maximum number of incoming signals supported by switch fabric 100 and m is the number of switches operating in parallel within switch fabric 100. A controller 108 assigns a different trace word to each different processor 110 and each processor 110 encodes its assigned trace word into the corresponding incoming signal.

Each demultiplexer 102 can receive and parallelize a different incoming signal on a bit-by-bit basis, whereby every $m^{th}$ bit of the incoming signal is transmitted to the same parallel switch 104. For example, in a particular embodiment of switch fabric 100 in which there are m=8 switches 104 operating in parallel, and assuming that switch fabric 100 is fully loaded with n incoming signals, each demultiplexer 102 transmits (1) the first bit of every 8-bit byte in the corresponding incoming signal to the first switch 104a in the column of parallel switches, (2) the second bit of every 8-bit byte in the corresponding incoming signal to the second switch 104b, and so on, for each bit and each switch 104.

Each switch 104 switches the corresponding subset of each incoming signal to a different output multiplexer 106. For example, the first switch 104a switches the first bit of each 8-bit byte for each incoming signal to a different output multiplexer 106. When properly configured, all of the switches 104 are configured identically to switch the corresponding subsets of the incoming signals to the appropriate output multiplexers 106.

Each output multiplexer 106 can receive and serialize bits for a different outgoing signal. In the example in which switch fabric 100 has eight switches 104, each multiplexer 106 receives from each of the eight switches 104 a different bit for each byte of an outgoing signal and serializes those bits to form the outgoing signal. That is, each multiplexer 106 receives the first bit of each 8-bit byte of the corresponding outgoing signal from the first switch 104a, the second bit of each 8-bit byte of the same outgoing signal from the second switch 104b, and so on, for each bit and every switch 104. Each output multiplexer 106 serializes the eight parallel streams of bits received from the eight switches 104 to form a single serial stream corresponding to the output signal.

As with other switch nodes, it is desirable to be able to verify that a switch node having a sliced architecture is configured properly. There are two basic types of improper configuration for a switch node having a sliced switch fabric such as switch fabric 100 of FIG. 1.

The first type of improper switch configuration is when all of the parallel switches 104 except one are properly configured. In this case, at least one bit of each byte of at least one incoming signal is either not routed at all or is routed by the improperly configured switch to the wrong output multiplexer 106. A particular example of this type of improper switch configuration occurs when one of the switches 104 simply fails to operate at all, in which case none of the bits received by that switch will be routed to any output multiplexer 106 and each corresponding bit in each outgoing signal will be the same (e.g., zero).

The second type of improper switch configuration is when all of the parallel switches 104 are configured identically, but incorrectly. In this case, all of the bits of at least one incoming signal is routed to the wrong output multiplexer 106.

Of course, the situation could exist where two or more, but less than all of the parallel switches 104 were misconfigured (either identically or differently) at the same time. This would be considered to be an example of two or more concurrent instances of the first type of improper switch configuration.

Unfortunately, the conventional technique of assigning a trace word to each incoming signal does not guarantee accurate determination of whether or not each and every parallel switch in a sliced architecture is configured properly. Using the conventional technique, one or more of the parallel switches could be improperly configured without being able to be detected by analyzing the conventional trace words contained in the outgoing signals.

Take, for example, a particular bit-sliced switch fabric having $2^{16}$ input demultiplexers and $2^{16}$ output multiplexers supporting up to $2^{16}$ different incoming signals and 8 parallel switches. Assume that a first incoming signal is assigned the following conventional 16-bit trace word:

(1 0 1 0 1 0 1 0 1 0 1 0 1 0 1 0), while a second incoming signal is assigned the following different conventional 16-bit trace word:

(1 1 1 1 1 1 1 1 1 1 1 1 1 1 1 1).

Assume further that the first incoming signal is supposed to be routed from the first input demultiplexer to the first output multiplexer, while the second incoming signal is supposed to be routed from the second input demultiplexer to the second output multiplexer. Because of the particular nature of these two trace words, every trace-word bit received by the first switch for both of these two incoming signals will have the value "1". As such, if all of the switches except the first switch were properly configured, and the first switch were improperly configured to switch the first incoming signal from the first input demultiplexer to the second (instead of the first) output multiplexer and the second incoming signal from the second input demultiplexer to the first (instead of the second) output multiplexer, such an improper configuration could not be detected by analyzing the trace words contained in the two outgoing signals generated by the first and second output multiplexers. This is because each of the trace words in the two outgoing signals would always be correct, even though the first switch would be improperly routing bits, since all of those improperly routed bits would have the same value of "1".

Thus, the conventional technique of assigning trace words fails to ensure that the configuration of each and every parallel switch in a sliced switch fabric can always be verified.

SUMMARY OF THE INVENTION

The present invention is directed to a scheme for verifying the configuration of each and every parallel switch in a switch fabric having a sliced architecture. According to the present invention, a trace word is assigned to each and every incoming signal such that, not only does the trace word uniquely identify the incoming signal, but each sliced trace word—that is, the subset of trace word bits processed by each of the parallel switches—also uniquely identifies the incoming signal. This scheme ensures that the configuration of each and every parallel switch can always be verified for all incoming signals.

In one embodiment, the present invention is a method and apparatus for verifying the switch configuration of a sliced switch fabric having a plurality of parallel switches. Each incoming signal is assigned a unique trace word, and the unique trace word is encoded into each incoming signal in accordance with an overall format that ensures that each sliced trace word routed by each parallel switch uniquely identifies the corresponding incoming signal, thereby ensuring that the switch configuration of each and every parallel switch can be verified.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
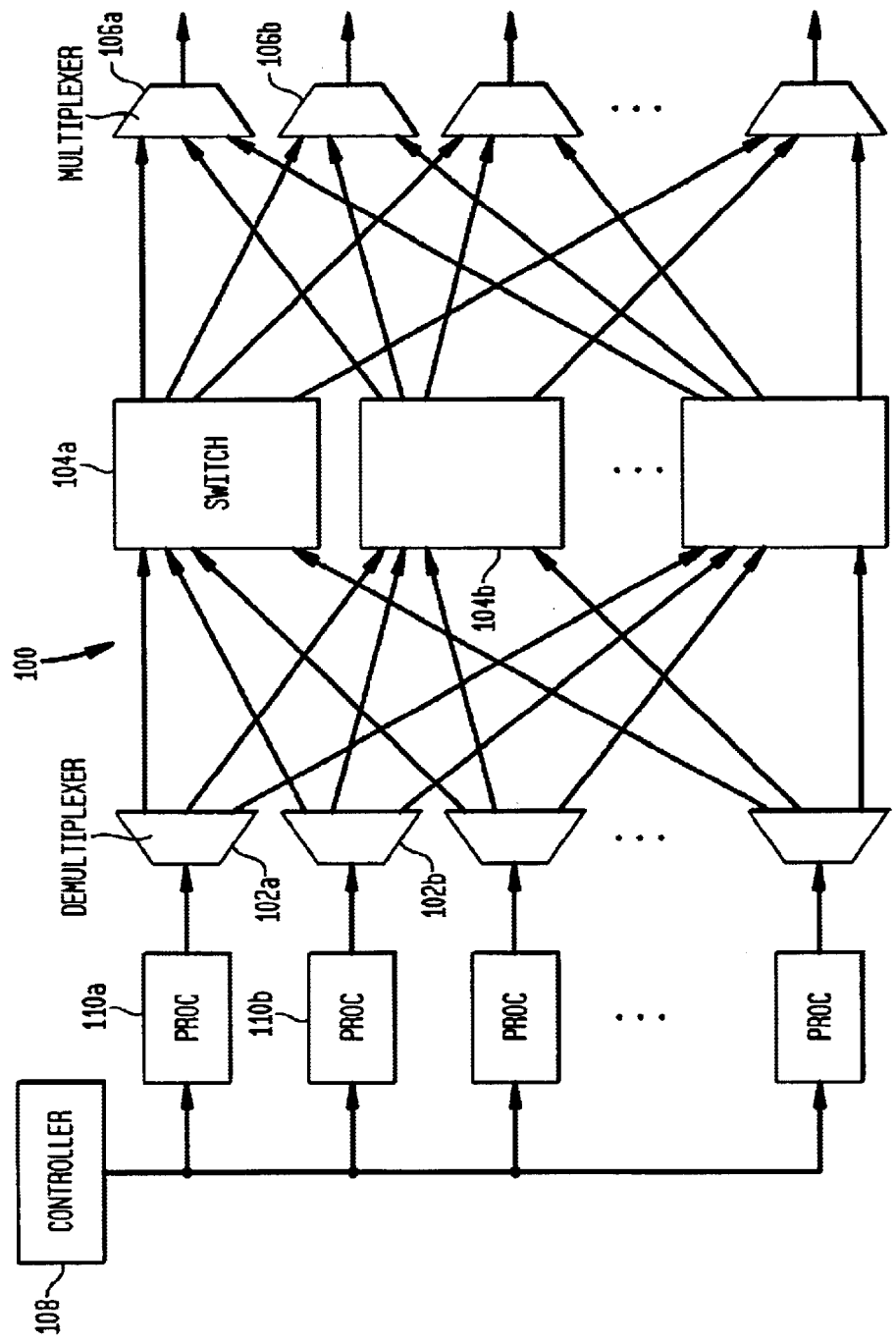
FIG. 1 shows a block diagram of the bit-sliced switch fabric of a typical switch node having a sliced architecture; and Table I shows the overall trace format for a bit-sliced switch fabric, such as the switch fabric of FIG. 1, having eight parallel switches and supporting up to $2^{20}$ incoming signals at a time, according to one particular embodiment of the present invention.

The present invention is directed to a scheme for encoding trace words into signals to ensure that the configuration of the switches in a sliced switch fabric can always be verified. According to the present invention, a unique trace word is assigned to each incoming signal, and the bits of that trace word are encoded into the signal data stream using a specially designed overall trace format. The overall format ensures that the subset of bits switched by each of the parallel switches in the sliced switch fabric—referred to herein as a sliced trace word—also uniquely identifies each incoming signal.

In certain embodiments of the present invention, the trace words may be equipment trace words that are used internal to a single piece of equipment. The present invention may also be applied to trace words that are used across a network containing two or more pieces of equipment.

Table I shows the overall trace format for a bit-sliced switch fabric, such as switch fabric 100 of FIG. 1, having eight parallel switches and supporting up to $2^{20}$ incoming signals at a time, according to one particular embodiment of the present invention. In this embodiment, each incoming signal is assigned a 20-bit trace word W[1–20] In Table I, W[i] is the $1^{th}$ bit of the trace word W[1–20] and FPI is a Format Phase Identification bit (described in further detail below). $\overline{W[i]}$ is the logical negation of W[i]. For example, if the least significant bit (LSB) of W[1–20] (i.e., W[1]) has a logical value of 1, then $\overline{W[1]}$ has a logical value of 0. Similarly, $\overline{FPI}$ is the logical negation of FPI. The trace word W[1–20] and its logical negation and the FPI bit and its logical negation are encoded into each incoming signal (e.g., within the overhead bits of a frame-based data structure) following the overall format of Table I, reading each row from left to right (i.e., from Column 1 to Column 8) and selecting rows from top to bottom (i.e., from Row 1 to Row 24). The overall format of Table I is continuously repeated in each incoming signal.

For a bit-sliced architecture having eight parallel switches, the overall format of Table I ensures that the configuration of each and every parallel switch can always be verified by analyzing the trace words in the outgoing signals. In preferred embodiments of the present invention, the trace format occupies a known, fixed position in one or more frames of the signal frame structure. It is common practice, but not necessary, to place that position on a byte boundary. As such, since Table I has eight columns, all of the bits in each column will be routed by the same parallel switch. That is, the bits in Column 1 of Table I will be routed by the first switch, the bits in Column 2 will be routed by the second switch, and so on for each column and each switch. Each column in Table I corresponds to a different sliced trace word.

Table I is designed such that all twenty bits of the trace word W[1–20] (or its logical negation) appear in each column. As such, when properly configured, each of the parallel switches routes a sliced trace word that uniquely identifies each incoming signal. This ensures the ability to verify the configuration of each and every parallel switch in the bit-sliced switch fabric, after all of the rows of Table I have been routed through the switch fabric.

Another characteristic of the overall trace format of Table I is that the 20-bit trace word W[1–20] is shifted cyclically between pairs of columns. That is, in Column 1, the least significant bit (LSB) of the trace word appears in Row 1 and the most significant bit (MSB) appears in Row 23. This pattern is shifted down by five bits in Column 3, five more bits in Column 5, and another five bits in Column 7.

This cyclical shifting reduces the amount of time that it takes before all twenty bits of the trace word are available in the outgoing signal. In particular, each and every possible set of six rows of the overall format of Table I contains all twenty bits of the trace word W[1–20]. This reduces the time that it takes to detect the second type of improper switch configuration, where all of the parallel switches are identically, but improperly configured. That is, the second type of improper switch configuration can be detected within the time that it takes to route and analyze any six rows of the overall format of Table I, rather than having to wait for all 24 rows to be routed and analyzed. This is true so long as it can be determined wherein in the overall format of Table I the six rows belong. This is where the rows of format phase identification (FPI) bits come in.

The patterns of instances of the format phase identification bit FPI and its logical negation $\overline{FPI}$ located in Rows 6, 12, 18, and 24 of Table I can be used to serve at least three functions: (1) to identify the start of the overall trace format (i.e., the location of Row 1 in the outgoing signal stream), (2) to identify quickly the current phase of the overall trace format (i.e., which row of the overall trace format is the current row in the outgoing signal stream, and (3) to carry an additional bit of information from upstream. Note that each and every possible set of six consecutive rows of the overall trace format of Table I has a single row of FPI bits, even when Table I is considered to be a continuous loop with Row 1 following Row 24.

The FPI bit can have a value of either "0" or "1". In either case, in Row 6, the bit values alternate between each two consecutive columns, except between Columns 6 and 7 and between Columns 8 and 1 (when viewing the values in the eight columns in a continuous loop). The pattern of FPI bits in Row 6 is shifted cyclically for Rows 12, 18, and 24, such that: for Row 12, the bit values are the same between Columns 4 and 5 and between Columns 6 and 7; for Row 18, the bit values are the same between Columns 2 and 3 and between Columns 4 and 5; and, for Row 20, the bit values are the same between Columns 8 and 1 and between Columns 2 and 3.

In all other rows of the overall format of Table I (i.e., those rows having trace word bits W[i] and their logical negations), the bit values will always differ between Columns 1 and 2, between Columns 3 and 4, between Columns 5 and 6, and between Columns 7 and 8. As such, the bit sequences in Rows 6, 12, 18, and 24, each of which has the same bit values in one of those four pairs of columns, unambiguously identify them as corresponding to a row of FPI bits and, in addition, which particular row of FPI bits. The row numbers are not usually conveniently available in the components. Thus, the FPI bits provide that information, since the byte values in rows 6, 12, 18, and 24 are each unique in the overall trace format of Table I. (A further, independent advantage to alternating the bits between Columns 1 & 2, 3 & 4, 5 & 6, and 7 & 8 is to ensure frequent data transitions to assist in phase acquisition.)

As such, any six consecutive rows of the overall trace format of Table I can be analyzed to identify which of the six rows is a row of FPI bits and which particular row of FPI bits it is (i.e., which one of Rows 6, 12, 18, and 24). Thus, the current location within the overall format can be determined within a time period no longer than the time that it takes to receive and analyze six rows of the overall format.

Since each and every set of six consecutive rows of the overall format of Table I has (1) all 20 bits of the trace word W[1–20] and (2) a row of FPI bits that can be used to identify the corresponding location in the overall format, the second type of improper switch configuration, where all of the parallel switches are identically and improperly configured, can be detected in the time that it takes to route and analyze six rows of the overall format of Table I. This is particularly important in applications where it is especially important to detect the occurrence of the second type of improper switch configuration very quickly. Note that the first type of improper switch configuration, where all but one of the parallel switches is correctly configured, can be detected in the time that it takes to route and analyze at least Rows 1–23 of Table I.

As mentioned earlier, the FPI bit can have a value of either "0" or "1". In fact, all of the previously described processing to identify which rows in the outgoing signal correspond to which particular rows of Table I can be performed whether the FPI bit has a value of "0" or a value of "1". This means that the FPI bit can be used to carry an additional bit of information. For example, in one possible application, the FPI bit can be used as a server signal fail (SSF) bit that indicates whether a failure has occurred upstream of the switch node.

The overall format of Table I is just one possible embodiment of the present invention. The present invention also covers other formats that satisfy the requirement that each and every sliced trace word uniquely identify each incoming signal. For example, for sliced switch fabrics that support fewer or more incoming signals, the number of bits in the trace word, the frequency of rows of FPI bits, and the total number of rows in the overall format may differ from those in Table I. Similarly, for sliced switch fabrics that have fewer or more than eight parallel switches, the number of columns in the overall format may differ from that in Table I. In addition, in applications that do not require fast detection of the second type of improper switch configuration, where all of the parallel switches are identically and improperly configured, the overall format need not have the same frequency of rows of FPI bits. In fact, a single row of FPI bits would be sufficient to identify the location of the start of the overall format, if that is all that is required. Alternatively, the FPI bits could be replaced by a separately distributed synchronization pulse.

With regard to FIG. 1 and Table I, the present invention has been described in the context of a bit-sliced architecture. Other types of sliced architectures are also possible, such as byte-sliced architectures, in which serial data streams are parallelized on a byte-by-byte basis. For a byte-sliced architecture, the value in each entry of the table corresponding to the overall trace format would be a byte rather than a bit, and logical negation would be performed bit-wise.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for verifying the switch configuration of a sliced switch fabric having a plurality of parallel switches, the sliced switch fabric configured to switch one or more incoming signals to one or more outgoing signals, the method comprising the steps of:

(a) assigning each incoming signal a unique trace word; and (b) encoding the unique trace word into said each incoming signal in accordance with an overall format that ensures that a sliced trace word routed by each parallel switch uniquely identifies the corresponding incoming signal, thereby ensuring that the switch configuration of each and every parallel switch can be verified, wherein the bits of the unique trace word are shifted between different sliced trace words to enable detection of an improper switch configuration in which all of the parallel switches are identically configured, but incorrectly configured, in a period of time less than the time to route the entire unique trace word.

2. The invention of claim 1, wherein the overall format is defined in terms of a table having one column for each parallel switch, wherein the bits in each column correspond to the sliced trace word for the corresponding parallel switch.

3. The invention of claim 2, wherein the table has one or more rows of format phase identification (FPI) bits that identify locations within the table.

4. The invention of claim 3, wherein the FPI bits carry one extra bit of information from upstream of the sliced switch fabric.

5. The invention of claim 3, wherein the table has two or more rows of FPI bits to enable detection of an improper switch configuration in which all of the parallel switches are identically configured, but incorrectly configured, in a period of time less than the time to route the entire table.

6. The invention of claim 3, wherein each row of FPI bits has a different pattern of FPI bits.

7. The invention of claim 2, wherein each column comprises information representing all of the bits of the unique trace word.

8. The invention of claim 7, wherein the bits of the unique trace word are shifted between different columns to reduce the minimum number of consecutive rows having all of the bits in the unique trace word and enable detection of an improper switch configuration in which all of the parallel switches are identically configured, but incorrectly configured, in a period of time less than the time to route the entire table.

9. The invention of claim 2, wherein, in each of one or more pairs of consecutive columns, one column is the logical negation of the other column.

10. The invention of claim 1, wherein:

the overall format is defined in terms of a table having one column for each parallel switch;

the bits in each column correspond to the sliced trace word for the corresponding parallel switch;

the table has two or more rows of FPI bits that identify locations within the table;

each row of FPI bits has a different pattern of FPI bits;

the FPI bits carry one extra bit of information from upstream of the sliced switch fabric;

each column comprises information representing all of the bits of the unique trace word;

in each of one or more pairs of consecutive columns, one column is the logical negation of the other column; and the bits of the unique trace word are shifted between different columns to reduce the minimum number of consecutive rows having all of the bits in the unique trace word and enable detection of an improper switch configuration in which all of the parallel switches are identically configured, but incorrectly configured, in a period of time less than the time to route the entire table.

11. An apparatus for verifying the switch configuration of a sliced switch fabric having a plurality of parallel switches, the sliced switch fabric configured to switch one or more incoming signals to one or more outgoing signals, the apparatus comprising:

(a) means for assigning each incoming signal a unique trace word; and (b) means for encoding the unique trace word into said each incoming signal in accordance with an overall format that ensures that a sliced trace word routed by each parallel switch uniquely identifies the corresponding incoming signal, thereby ensuring that the switch configuration of each and every parallel switch can be verified, wherein the bits of the unique trace word are shifted between different sliced trace words to enable detection of an improper switch configuration in which all of the parallel switches are identically configured, but incorrectly configured, in a period of time less than the time to route the entire unique trace word.

12. The invention of claim 11, wherein the overall format is defined in terms of a table having one column for each parallel switch, wherein the bits in each column correspond to the sliced trace word for the corresponding parallel switch.

13. The invention of claim 12, wherein the table has one or more rows of format phase identification (FPI) bits that identify locations within the table.

14. The invention of claim 13, wherein the FPI bits carry one extra bit of information from upstream of the sliced switch fabric.

15. The invention of claim 13, wherein the table has two or more rows of FPI bits to enable detection of an improper switch configuration in which all of the parallel switches are identically configured, but incorrectly configured, in a period of time less than the time to route the entire table.

16. The invention of claim 13, wherein each row of FPI bits has a different pattern of FPI bits.

17. The invention of claim 12, wherein each column comprises information representing all of the bits of the unique trace word.

18. The invention of claim 17, wherein the bits of the unique trace word are shifted between different columns to reduce the minimum number of consecutive rows having all of the bits in the unique trace word and enable detection of an improper switch configuration in which all of the parallel switches are identically configured, but incorrectly configured, in a period of time less than the time to route the entire table.

19. The invention of claim 12, wherein, in each of one or more pairs of consecutive columns, one column is the logical negation of the other column.

20. The invention of claim 11, wherein:

the overall format is defined in terms of a table having one column for each parallel switch;

the bits in each column correspond to the sliced trace word for the corresponding parallel switch;

the table has two or more rows of FPI bits that identify locations within the table;

each row of FPI bits has a different pattern of FPI bits;

the FPI bits carry one extra bit of information from upstream of the sliced switch fabric;

each column comprises information representing all of the bits of the unique trace word;

in each of one or more pairs of consecutive columns, one column is the logical negation of the other column; and the bits of the unique trace word are shifted between different columns to reduce the minimum number of consecutive rows having all of the bits in the unique trace word and enable detection of an improper switch configuration in which all of the parallel switches are identically configured, but incorrectly configured, in a period of time less than the time to route the entire table.

21. The invention of claim 1, wherein the overall format comprises one or more FPI bits that identify one or more locations within the overall format.

22. The invention of claim 21, wherein each sliced trace word comprises one or more FPI bits.

23. The invention of claim 1, wherein at least two sliced trace words for each unique trace word are logical negations of each other.

24. The invention of claim 23, wherein each sliced trace word for each unique trace word is one of a pair of sliced trace words, for said each unique trace word, that are logical negations of each other.

25. The invention of claim 11, wherein the overall format comprises one or more FPI bits that identify one or more locations within the overall format.

26. The invention of claim 25, wherein each sliced trace word comprises one or more FPI bits.

27. The invention of claim 11, wherein at least two sliced trace words for each unique trace word are logical negations of each other.

28. The invention of claim 27, wherein each sliced trace word for each unique trace word is one of a pair of sliced trace words, for said each unique trace word, that are logical negations of each other.

29. A method for verifying the switch configuration of a sliced switch fabric having a plurality of parallel switches, the sliced switch fabric configured to switch one or more incoming signals to one or more outgoing signals, the method comprising the steps of:

(a) assigning each incoming signal a unique trace word; and (b) encoding the unique trace word into said each incoming signal in accordance with an overall format that ensures that a sliced trace word routed by each parallel switch uniquely identifies the corresponding incoming signal, thereby ensuring that the switch configuration of each and every parallel switch can be verified, wherein the overall format comprises one or more FPI bits that identify one or more locations within the overall format.

30. The invention of claim 29, wherein each sliced trace word comprises one or more FPI bits.

31. A method for verifying the switch configuration of a sliced switch fabric having a plurality of parallel switches, the sliced switch fabric configured to switch one or more incoming signals to one or more outgoing signals, the method comprising the steps of:

(a) assigning each incoming signal a unique trace word; and (b) encoding the unique trace word into said each incoming signal in accordance with an overall format that ensures that a sliced trace word routed by each parallel switch uniquely identifies the corresponding incoming signal, thereby ensuring that the switch configuration of each and every parallel switch can be verified, wherein at least two sliced trace words for each unique trace word are logical negations of each other.

32. The invention of claim 31, wherein each sliced trace word for each unique trace word is one of a pair of sliced trace words, for said each unique trace word, that are logical negations of each other.

* * * * *